(12) United States Patent
Hruska et al.

(10) Patent No.: US 9,201,763 B1
(45) Date of Patent: Dec. 1, 2015

(54) EFFICIENT SHARING OF TEST FIXTURES AND ORDERING OF TEST SUITES

(71) Applicant: The MathWorks, Inc., Natick, MA (US)

(72) Inventors: David Hruska, Chestnut Hill, MA (US); Andrew T. Campbell, Medway, MA (US); David M. Saxe, Stow, MA (US); David A. Foti, Holliston, MA (US)

(73) Assignee: The MathWorks, Inc., Natick, MA (US)

( * ) Notice: Subject to any disclaimer, the term of this patent is extended or adjusted under 35 U.S.C. 154(b) by 140 days.

(21) Appl. No.: 13/907,038

(22) Filed: May 31, 2013

(51) Int. Cl.
*G06F 11/00* (2006.01)
*G06F 11/36* (2006.01)

(52) U.S. Cl.
CPC ............ *G06F 11/3664* (2013.01); *G06F 11/36* (2013.01); *G06F 11/3672* (2013.01)

(58) Field of Classification Search
CPC ............ G06F 11/3672; G06F 11/3676; G06F 11/3686; G06F 11/86; G06F 11/368; G06F 11/3688
USPC ............ 717/124, 125; 714/13, 36, 25, 43, 48, 714/704, 733
See application file for complete search history.

(56) References Cited

U.S. PATENT DOCUMENTS

| | | | |
|---|---|---|---|
| 7,299,451 B2 * | 11/2007 | Dygon et al. | 717/124 |
| 2003/0014734 A1 * | 1/2003 | Hartman et al. | 717/125 |
| 2003/0046613 A1 * | 3/2003 | Farchi et al. | 714/38 |
| 2005/0278576 A1 * | 12/2005 | Hekmatpour | 714/37 |
| 2007/0162894 A1 * | 7/2007 | Noller et al. | 717/124 |
| 2007/0168734 A1 * | 7/2007 | Vasile | 714/33 |
| 2007/0191053 A1 * | 8/2007 | Suzuki | 455/522 |
| 2009/0024874 A1 * | 1/2009 | Proto | 714/38 |
| 2009/0307763 A1 * | 12/2009 | Rawlins et al. | 726/5 |

OTHER PUBLICATIONS

Baudry, "Improving Test Suites for Efficient Fault Localization" May 2006, ACM, p. 82-91.*
Ostrand, The Category-Partition Method for Specifying and Generating Functional Tests, Jun. 1988, ACM, vol. 31 #6, pp. 676-686.*

* cited by examiner

*Primary Examiner* — Bryce Bonzo
*Assistant Examiner* — Jeison C Arcos
(74) *Attorney, Agent, or Firm* — Harrity & Harrity, LLP

(57) ABSTRACT

A device receives a first test class associated with a first fixture. The first test class includes first method(s) to test portion(s) of dynamically-type programming code, and the first fixture defines first environment(s) for the first method(s). The device receives a second test class associated with the first fixture and a second fixture. The second test class includes second method(s) to test the code portion(s). The first fixture defines the first environment(s) for the second method(s), and the second fixture defines second environment(s) for the second method(s). The device combines the first method(s) of the first test class and the second method(s) of the second test class to create a test group, and analyzes the test group to determine whether the test group is correctly organized based on the first fixture and the second fixture. The device provides a reorganized test group when the test group is incorrectly organized.

20 Claims, 18 Drawing Sheets

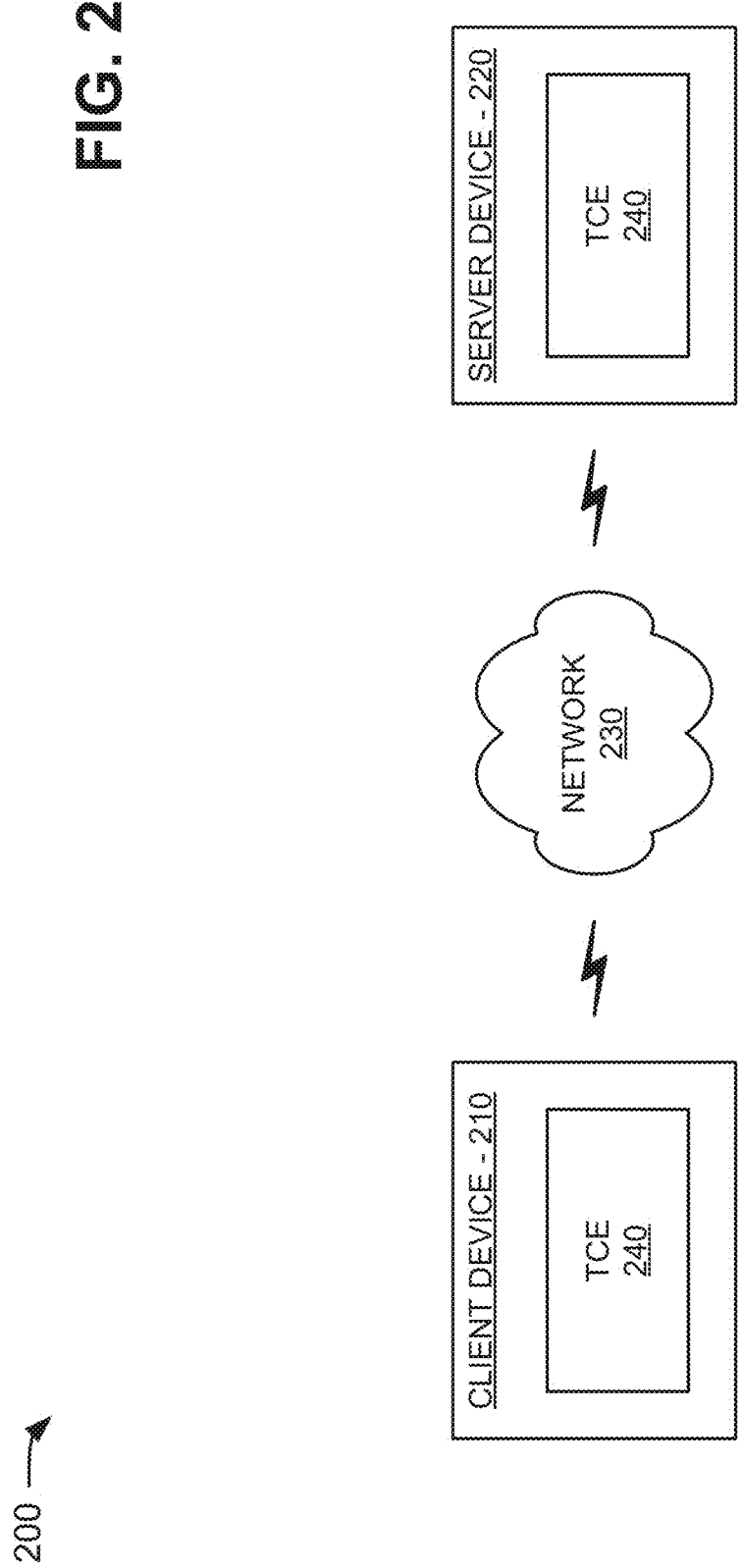

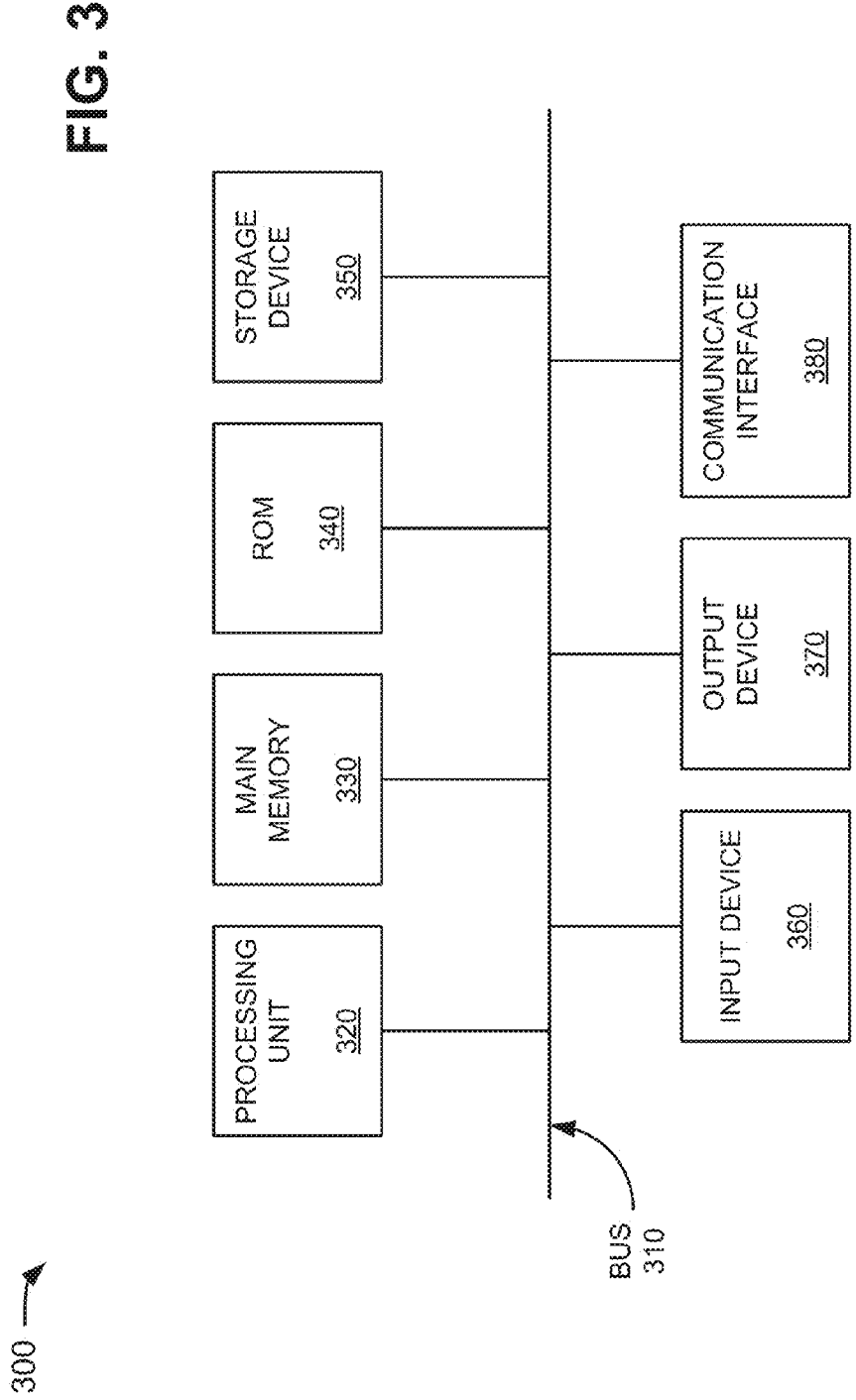

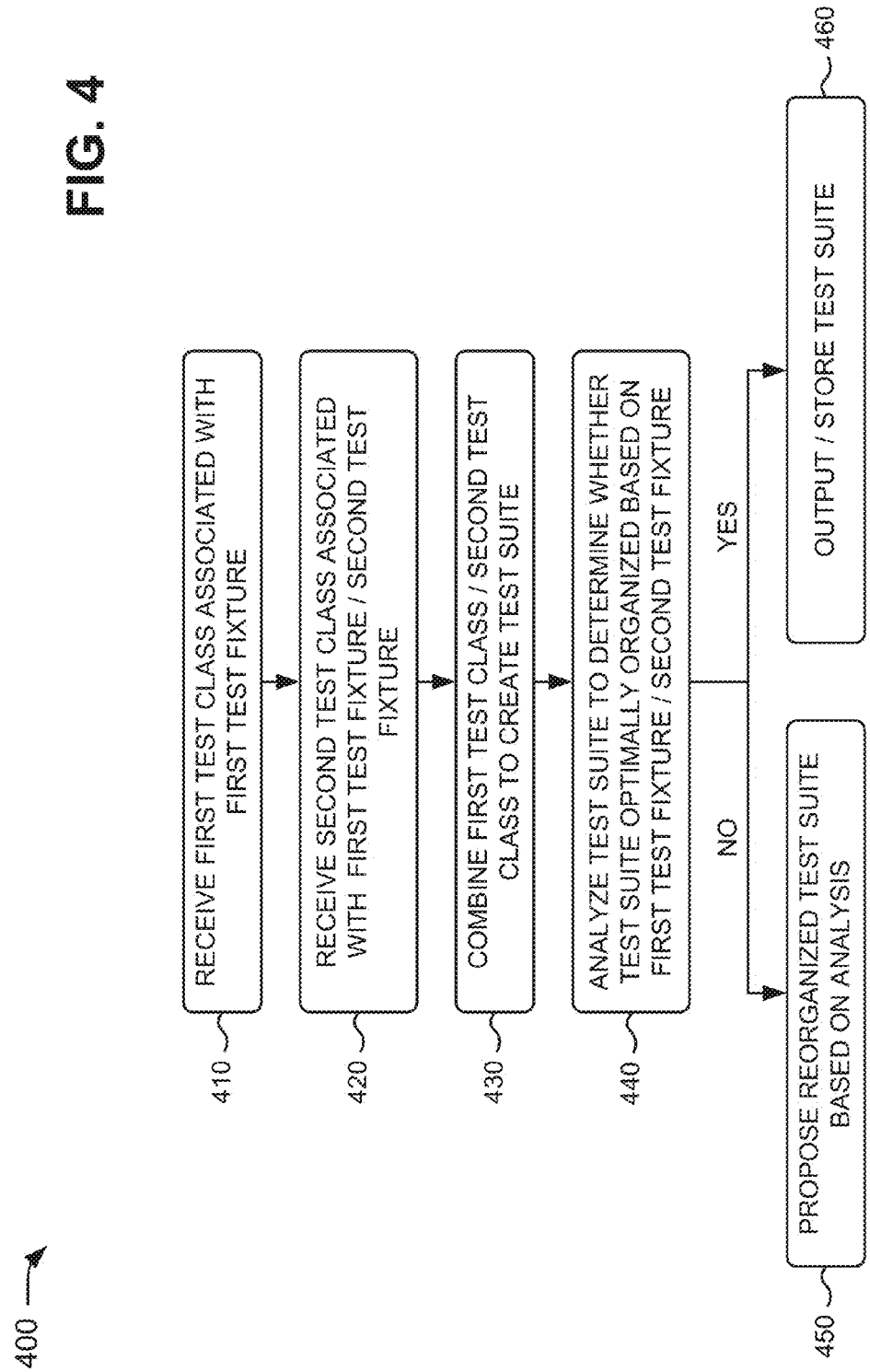

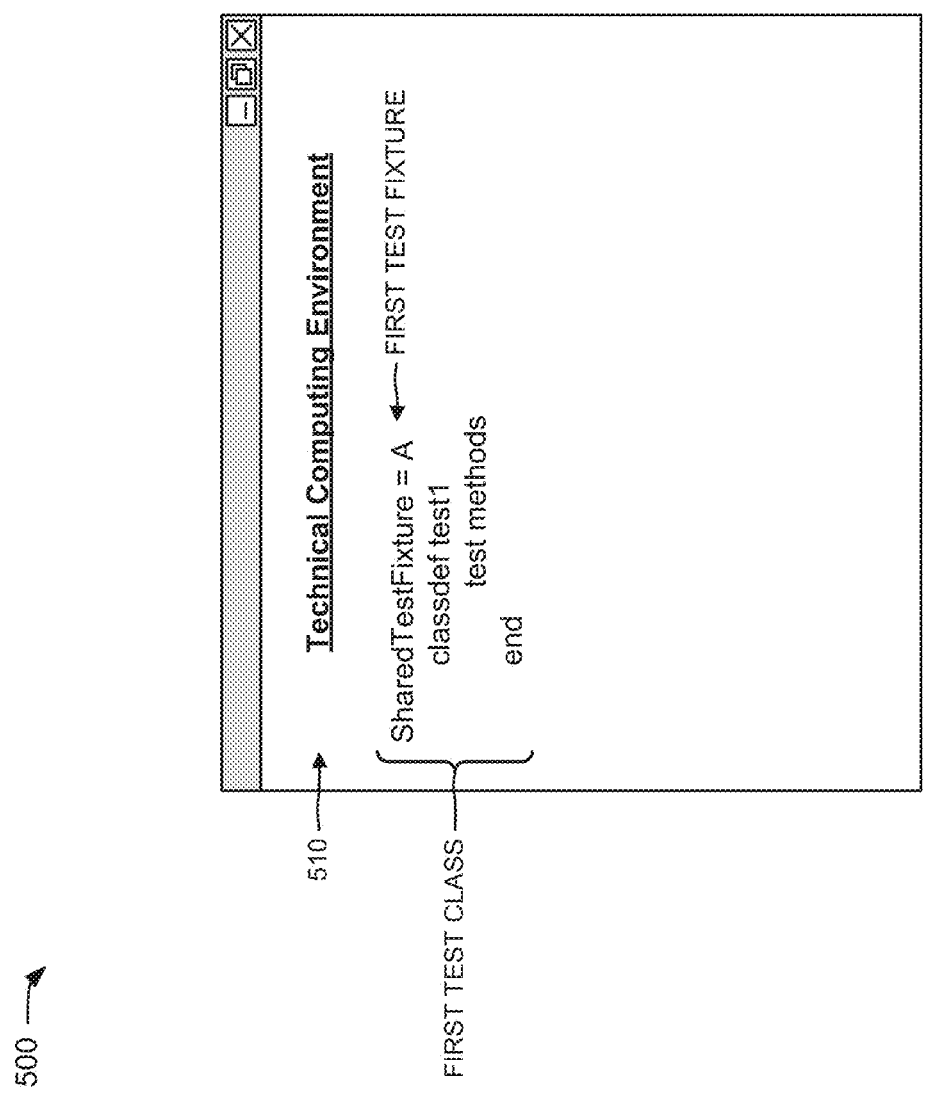

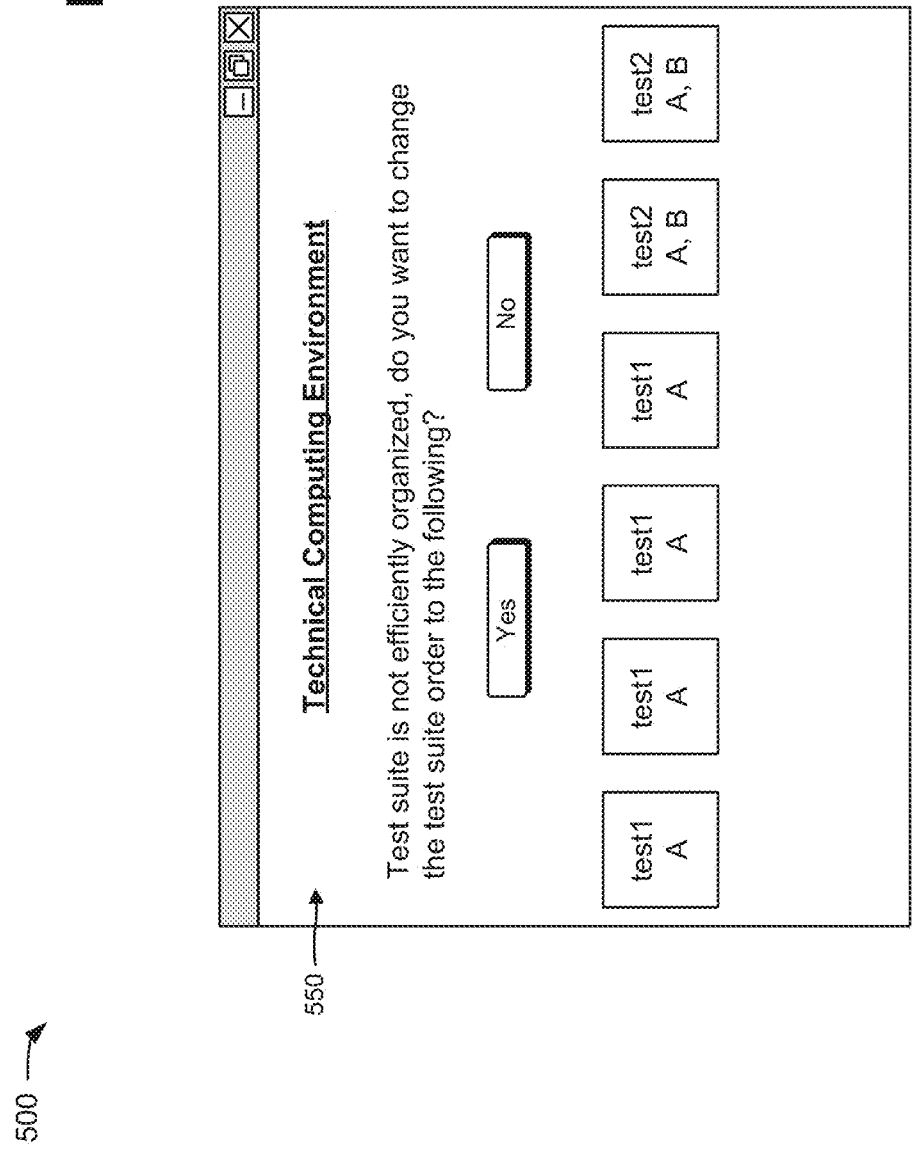

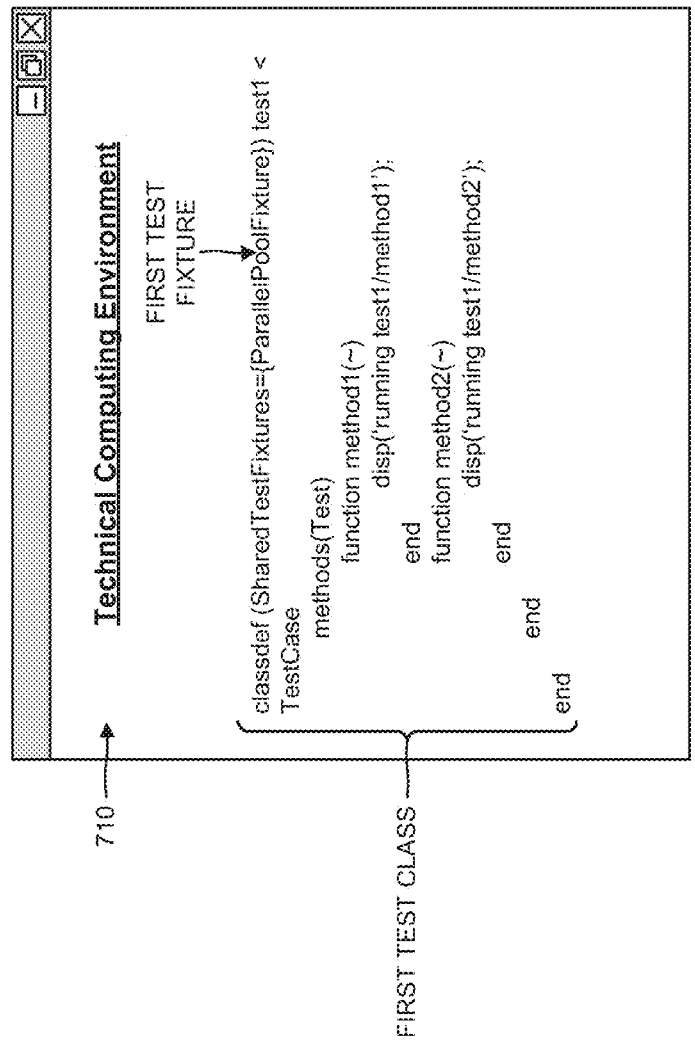

FIG. 7C

```
Technical Computing Environment

SECOND TEST
                             FIXTURE
classdef (SharedTestFixtures={ThirdPartySoftwareFixture})
test3 < TestCase
    methods(Test)
        function method1(~)
            disp('running test3/method1');
        end
        function method2(~)
            disp('running test3/method2');
        end
    end
end
```

730

THIRD TEST CLASS

700

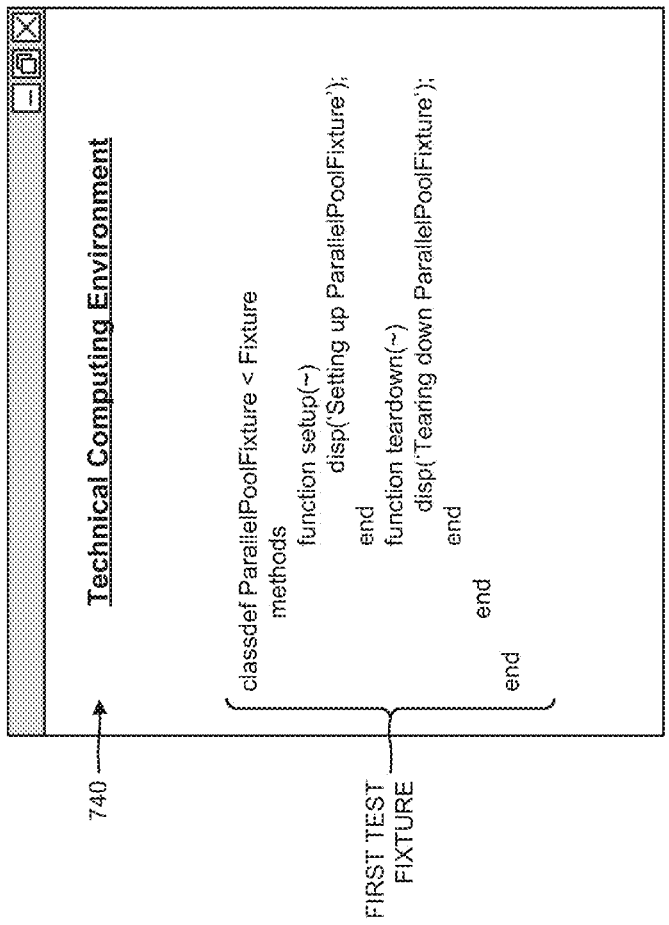

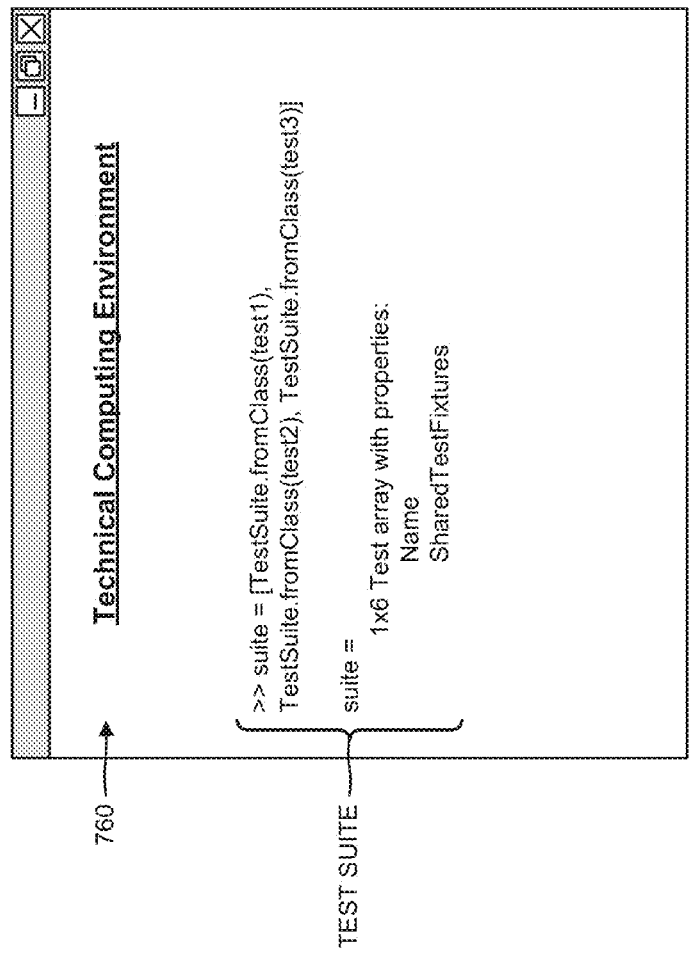

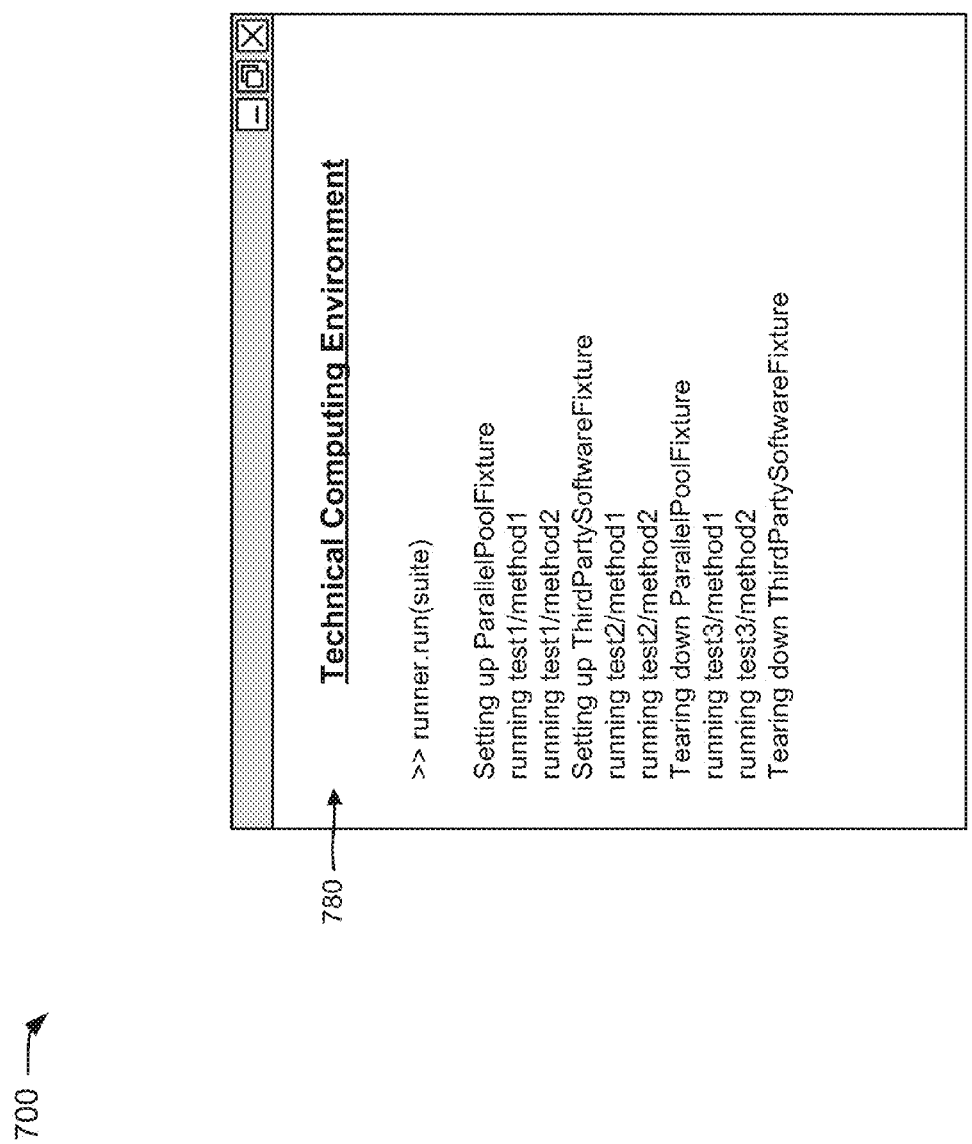

EFFICIENT SHARING OF TEST FIXTURES AND ORDERING OF TEST SUITES

BRIEF DESCRIPTION OF THE DRAWINGS

The accompanying drawings, which are incorporated in and constitute a part of this specification, illustrate one or more implementations and, together with the description, explain these implementations. In the drawings:

FIG. 2 is a diagram of an example environment in which systems and/or methods described herein may be implemented;

FIG. 3 is a diagram of example components of one or more of the devices of the environment depicted in FIG. 2;

FIG. 4 is a flow chart of an example process for organizing a test suite based on test fixtures;

FIGS. 5A-5E are diagrams of an example of the process described in connection with FIG. 4;

FIGS. 7A-7H are diagrams of an example of the process described in connection with FIG. 6.

DETAILED DESCRIPTION

The following detailed description refers to the accompanying drawings. The same reference numbers in different drawings may identify the same or similar elements.

Software testing is the process used to measure the quality of developed computer software or code. One type of testing, unit testing, involves testing fundamental units of the software. Unit testing may be carried out by writing automated test code that executes a fundamental unit and checks inputs and outputs of the fundamental unit, one detail at a time. Such automated test code may enable programmers to verify portions of the software. Frameworks used to manage automated test code are referred to as code-driven testing frameworks.

An example of such frameworks is the xUnit framework, which includes a JUnit framework and a NUnit framework. The xUnit framework enables testing of different elements (e.g., units) of software, such as functions and classes. The xUnit framework may provide an automated solution that eliminates a need for a programmer to execute the same tests many times and to remember what should be a result of each test.

OVERVIEW

Systems and/or methods described herein may provide a mechanism for robust and efficient sharing of test fixtures that configure environmental state for test execution. The systems and/or methods may enable a combination (e.g., a test suite) of test methods to be executed in an efficient manner. As each test method in the test suite is executed, any test fixtures that had been set up for previous test methods and are no longer needed may be torn down (e.g., disabled). Any required test fixtures, which are not already set up (e.g., enabled), may be set up. If particular test fixtures are guaranteed to not interfere with other test fixtures, the particular test fixtures may be set up and torn down in any order.

Figure 1:
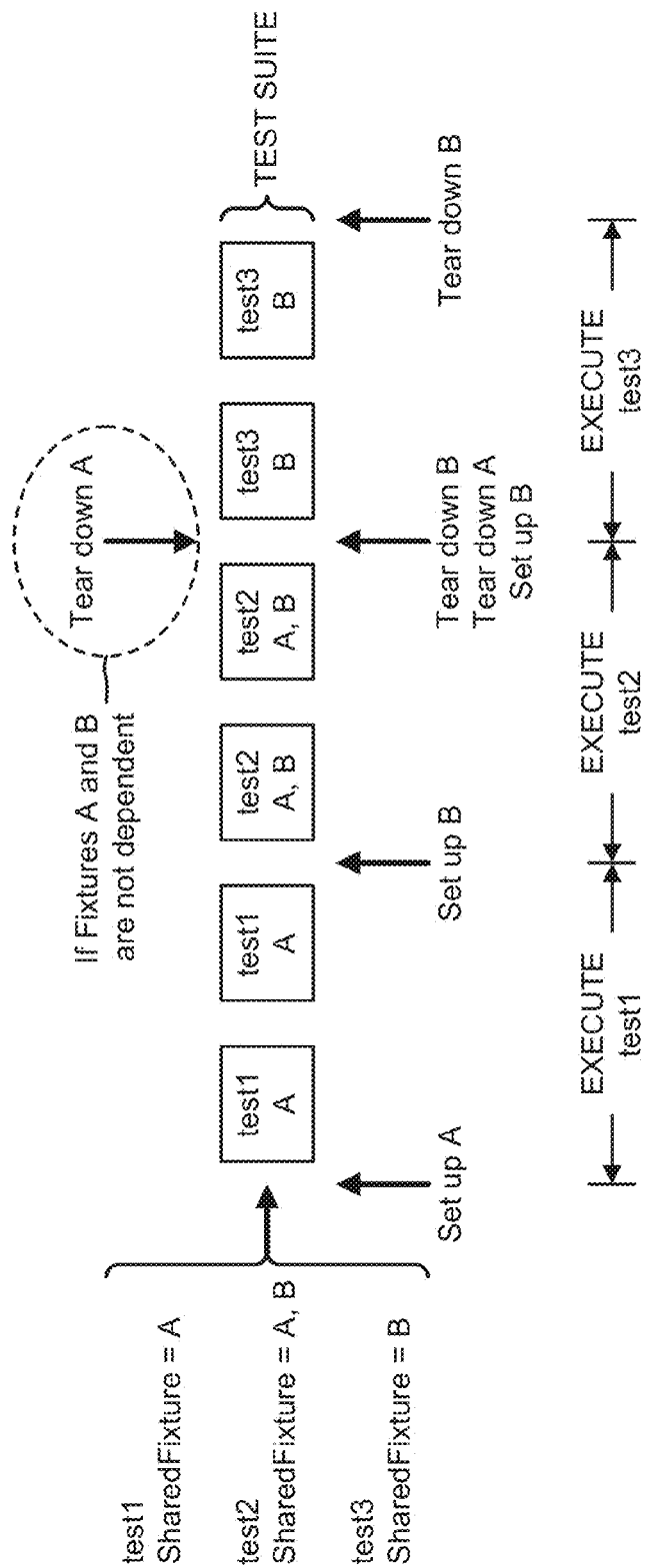
FIG. 1 is a diagram of an overview of example implementations described herein.

FIG. 1 is a diagram of an overview of example implementations described herein. For the overview, assume that a device receives a portion of code to be tested, a first test class (e.g., test1), a second test class (e.g., test2), and a third test class (e.g., test3). The code portion, for example, may include all or a portion of code written in a dynamically-typed programming language. Each of the test classes may include one or more test methods for testing the code portion. The first test class may be associated with a first test fixture (e.g., A), the second test class may be associated with the first test fixture and a second test fixture (e.g., A and B), and the third test class may be associated with the second test fixture (e.g., B). A test fixture may provide a means to configure an environmental state to correctly execute a test method. The environment may include, for example, a compiler used for compiling the code portion, a parallel computing environment, a licensing environment, etc. Each test class may independently specify any number of test fixtures as required by the test class.

A user of the device may create a test suite or group that includes one or more test classes. For overview, assume that the user includes the three test classes (e.g., test1, test2, and test3) in the test suite. As shown in FIG. 1, the test suite may include test suite elements corresponding to the test methods of the three test classes. For example, the test suite may include test suite elements for two test methods of the first test class (e.g., test1) and the first test fixture (e.g., A); test suite elements for two test methods of the second test class (e.g., test2) and the first and second test fixtures (e.g., A and B); and test suite elements for two test methods of the third test class (e.g., test3) and the second test fixture (e.g., B). The device may execute the test suite elements in any order. When the test methods use the same shared test fixture, the device may group and execute the test methods together.

The device may set up (e.g., enable) any required test fixtures, and may begin executing the test methods. As each test method in the test suite is executed, the device may tear down (e.g., disable) any test fixtures that have been set up for previous test methods and are no longer needed. The device may tear down the test fixtures in a reverse order (e.g., a last-in, first-out (LIFO) order) from which the test fixtures are set up. LIFO ordering may restore a test environment to an original state when more than one test fixture affects the test environment. If certain test fixtures do not interfere with other test fixtures, the certain test fixtures may be set up and torn down in any order.

For example, as shown in FIG. 1, the device may set up the first test fixture (e.g., A), and may execute the test methods for the first test class (e.g., test1) with the first test fixture. The device may set up the second test fixture (e.g., B), and may execute the test methods for the second test class (e.g., test2) with the first and second test fixtures. The device may tear down the second test fixture, may tear down the first test fixture, and may set up the second test fixture. The device may execute the test methods for the third test class (e.g., test3) with the second test fixture, and may tear down the second test fixture. However, if the first test fixture (e.g., A) and the second test fixture (e.g., B) are not dependent (e.g., do not interfere with each other), only the first test fixture may be torn down prior to executing the test methods for the third test class, as further shown in FIG. 1.

Such an arrangement may provide efficiency gains since shared test fixtures may be set up and torn down only once (e.g., when the test fixture requires a significant amount of time to set up and/or tear down). The arrangement may enable each test class to independently specify any number of shared test fixtures, and may enable multiple test classes to execute in any order with a correct set of test fixtures. The arrangement may enable a test suite to be dynamically reordered while still maintaining the correct set of test fixtures. The test fixtures may be set up and torn down in a LIFO order when required, and may be reused to a greatest extent possible. The arrangement may enable test developers to utilize arbitrary sets of test fixtures without the test methods corrupting an environmental state.

User interfaces, as described herein, may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user of a client device (e.g., via a touch screen display, a mouse, a keyboard, a keypad, voice commands, etc.).

The term code, as used herein, is to be broadly interpreted to include text-based code that may not require further processing to execute (e.g., C++ code, Hardware Description Language (HDL) code, very-high-speed integrated circuits (VHSIC) HDL(VHDL) code, Verilog, Java, and/or other types of hardware or software based code that may be compiled and/or synthesized); binary code that may be executed (e.g., executable files that may directly be executed by an operating system, bitstream files that can be used to configure a field programmable gate array (FPGA), Java byte code, object files combined together with linker directives, source code, makefiles, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc. In one example, code may include different combinations of the above-identified classes (e.g., text-based code, binary code, text files, etc.). Alternatively, or additionally, code may include code generated using a dynamically-typed programming language (e.g., the M language, a MATLAB® language, a MATLAB-compatible language, a MATLAB-like language, etc.) that can be used to express problems and/or solutions in mathematical notations. Alternatively, or additionally, code may be of any type, such as function, script, object, etc., and a portion of code may include one or more characters, lines, etc. of the code.

Example Environment Arrangement

FIG. 2 is a diagram of an example environment 200 in which systems and/or methods described herein may be implemented. As illustrated, environment 200 may include a client device 210 interconnected with a server device 220 via a network 230. Components of environment 200 may interconnect via wired and/or wireless connections.

Client device 210 may include one or more devices that are capable of communicating with server device 220 via network 230. For example, client device 210 may include a laptop computer, a personal computer, a tablet computer, a desktop computer, a workstation computer, a smart phone, a personal digital assistant (PDA), and/or other computation and communication devices. In some implementations, client device 210 may include a technical computing environment (TCE) 240, described below.

Server device 220 may include one or more server devices, or other types of computation and communication devices. Server device 220 may include a device that is capable of communicating with client device 210 (e.g., via network 230). In some implementations, server device 220 may include one or more laptop computers, personal computers, workstation computers, servers, central processing units (CPUs), graphical processing units (GPUs), application-specific integrated circuits (ASICs), field-programmable gate arrays (FPGAs), etc. In some implementations, server device 220 may include TCE 240 and may perform some or all of the functionality described herein for client device 210. Alternatively, server device 220 may be omitted and client device 210 may perform all of the functionality described herein for client device 210.

Network 230 may include a network, such as a local area network (LAN), a wide area network (WAN), a metropolitan area network (MAN), a telephone network, such as the Public Switched Telephone Network (PSTN) or a cellular network, an intranet, the Internet, or a combination of networks.

As indicated above, TCE 240 may be provided within a computer-readable medium of client device 210. Alternatively, or additionally, TCE 240 may be provided in another device (e.g., server device 220) that is accessible by client device 210. TCE 240 may include hardware or a combination of hardware and software that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In some implementations, TCE 240 may include a dynamically-typed programming language (e.g., the M language, a MATLAB® language, a MATLAB-compatible language, a MATLAB-like language, etc.) that can be used to express problems and/or solutions in mathematical notations.

For example, TCE 240 may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations. In addition, TCE 240 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE 240 may further provide mathematical functions and/or graphical tools (e.g., for creating plots, surfaces, images, volumetric representations, etc.). In some implementations, TCE 240 may provide these functions and/or tools using toolboxes (e.g., toolboxes for signal processing, image processing, data plotting, parallel processing, etc.). In some implementations, TCE 240 may provide these functions as block sets or in another way, such as via a library, etc.

TCE 240 may be implemented as a text-based environment (e.g., MATLAB software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim;

etc.); a graphically-based environment (e.g., Simulink® software, Stateflow® software, SimEvents® software, Simscape™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; aspects of a Unified Modeling Language (UML) or SysML environment; etc.); or another type of environment, such as a hybrid environment that includes one or more of the above-referenced text-based environments and one or more of the above-referenced graphically-based environments.

TCE 240 may include a programming language (e.g., the MATLAB language) that may be used to express problems and/or solutions in mathematical notations. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following statements:

A='hello'
A=int32([1, 2])
A=[1.1, 2.2, 3.3]

Now suppose the program is executed, for example, in a TCE, such as TCE 240. During run-time, when the statement "A='hello'" is executed the data type of variable "A" may be a string data type. Later when the statement "A=int32([1, 2])" is executed the data type of variable "A" may be a 1-by-2 array containing elements whose data type are 32 bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in a dynamically type array-based computing language, data may be represented by arrays and data types of data may be determined at run-time.

TCE 240 may provide mathematical routines and a high-level programming language suitable for non-professional programmers and may provide graphical tools that may be used for creating plots, surfaces, images, volumetric representations, or other representations. TCE 240 may provide these routines and/or tools using toolboxes (e.g., toolboxes for signal processing, image processing, data plotting, parallel processing, etc.). TCE 240 may also provide these routines in other ways, such as, for example, via a library, local or remote database (e.g., a database operating in a computing cloud), remote procedure calls (RPCs), and/or an application programming interface (API). TCE 240 may be configured to improve runtime performance when performing computing operations. For example, TCE 240 may include a just-in-time (JIT) compiler.

Although FIG. 2 shows example components of environment 200, in some implementations, environment 200 may include fewer components, different components, differently arranged components, or additional components than those depicted in FIG. 2. Alternatively, or additionally, one or more components of environment 200 may perform one or more tasks described as being performed by one or more other components of environment 200.

Example Device Architecture

FIG. 3 is an example diagram of a device 300 that may correspond to one or more of the devices of environment 200. As illustrated, device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of device 300.

Processing unit 320 may include one or more processors, microprocessors, or other types of processing units that may interpret and execute instructions. Main memory 330 may include one or more random access memories (RAMs) or other types of dynamic storage devices that may store information and/or instructions for execution by processing unit 320. ROM 340 may include one or more ROM devices or other types of static storage devices that may store static information and/or instructions for use by processing unit 320. Storage device 350 may include a magnetic and/or optical recording medium and its corresponding drive.

Input device 360 may include a mechanism that permits a user to input information to device 300, such as a keyboard, a camera, an accelerometer, a gyroscope, a mouse, a pen, a microphone, voice recognition and/or biometric mechanisms, a remote control, a touch screen, a neural interface, etc. Output device 370 may include a mechanism that outputs information to the user, including a display, a printer, a speaker, etc. Communication interface 380 may include any transceiver-like mechanism that enables device 300 to communicate with other devices, networks, and/or systems. For example, communication interface 380 may include mechanisms for communicating with another device or system via a network.

As described herein, device 300 may perform certain operations in response to processing unit 320 executing software instructions contained in a computer-readable medium, such as main memory 330. A computer-readable medium may be defined as a non-transitory memory device. A memory device may include space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in some implementations, device 300 may include fewer components, different components, differently arranged components, or additional components than depicted in FIG. 3. Alternatively, or additionally, one or more components of device 300 may perform one or more tasks described as being performed by one or more other components of device 300.

Example Process for Organizing a Test Suite Based on Test Fixtures

FIG. 4 is a flow chart of an example process 400 for organizing a test suite based on test fixtures. In some implementations, process 400 may be performed by client device 210 (e.g., TCE 240). In some implementations, process 400 may be performed by another device or a group of devices (e.g., server device 220) separate from or including client device 210.

As shown in FIG. 4, process 400 may include receiving a first test class associated with a first test fixture (block 410). For example, a user of client device 210 may provide a first test class to an environment (e.g., TCE 240) of client device 210. The first test class may include one or more test methods that may be used to test one or more portions of code generated via TCE 240. The first test class may be associated with a first test fixture. In some implementations, the first test class may include syntax of a general form:

SharedTestFixture=A
        classdef test1, where test1 may correspond to the first test class, and A may correspond to the first test fixture. Client device 210/TCE 240 may receive the first test class and the first test fixture, and may store the first test class and the first test fixture in a memory (e.g., main memory 330, ROM 340, and/or storage device 350 of FIG. 3) associated with client device 210. In some implementations, client device 210/TCE 240 may retrieve the first test class and the first test fixture from the memory.

As further shown in FIG. 4, process 400 may include receiving a second test class associated with the first test fixture and a second test fixture (block 420). For example, a user of client device 210 may provide a second test class to an environment (e.g., TCE 240) of client device 210. The second test class may include one or more test methods that may be used to test one or more portions of the code generated via TCE 240. The second test class may be associated with the first test fixture and a second test fixture. In some implementations, the second test class may include syntax of a general form:

SharedTestFixture=A, B
        classdef test2, where test2 may correspond to the second test class, A may correspond to the first test fixture, and B may correspond to the second test fixture. Client device 210/TCE 240 may receive the second test class, the first test fixture, and the second test fixture, and may store the second test class, the first test fixture, and the second test fixture in a memory (e.g., main memory 330, ROM 340, and/or storage device 350 of FIG. 3) associated with client device 210. In some implementations, client device 210/TCE 240 may retrieve the second test class, the first test fixture, and the second test fixture from the memory.

Returning to FIG. 4, process 400 may include combining the first test class and the second test class to create a test suite (block 430). For example, the user may provide a test suite command to client device 210/TCE 240. The test suite command may include syntax of a general form:

suite=[TestSuite.fromClass(test1), TestSuite.fromClass(test2)], where suite may correspond to the test suite, TestSuite.fromClass may correspond to a test suite command that creates the test suite from the test methods provided in the test classes, test1 may correspond to the first test class, and test2 may correspond to the second test class. Client device 210/TCE 240 may receive the test suite command, and may create, based on the command, a test suite that includes a combination of the test methods of the first test class and the second test class.

As further shown in FIG. 4, process 400 may include analyzing the test suite to determine whether the test suite is optimally organized based on the first test fixture and the second test fixture (block 440). For example, client device 210 may analyze the test methods of the test suite to determine which test methods share the same test fixtures. In some implementations, the test methods of the first test class and the second test class may share the first test fixture. Based on this determination, client device 210 may determine whether the test methods of the first test class and the second test class are grouped together. Grouping these test methods together may provide an efficient ordering for the test methods since the first test fixture may only need to be set up and torn down once.

In some implementations, client device 210 may determine whether the ordering for the test methods of the test suite are organized correctly based on timing associated with the first and second test fixtures. For example, if the first test fixture takes longer to set up and tear down than the second test fixture, client device 210 may determine that the test methods associated with the first test fixture should be scheduled and executed after the test methods associated with the second test fixture.

In some implementations, the optimal ordering of the test methods in the test suite may depend not only on the time to set up and tear down each fixture, but also on the required set of fixtures for each test. For example, consider the following four tests with fixtures A, B, C: Test1(A), Test2(A, B), Test3(A), and Test4(A, B, C). Executing the tests in this order may require: Test1 to set up A; Test2 to set up B; Test3 to tear down B; and Test4 to set up B, set up C, tear down C, tear down B, and tear down A. However, the test suite may be reordered as follows: Test1(A), Test3(A), Test2(A, B), and Test4(A, B, C). With this reordering, the fixture work may be reduced to have: Test1 set up A; Test3 set up nothing; Test2 set up B; and Test4 set up C, tear down C, tear down B, and tear down A.

In some implementations, client device 210 may determine whether the ordering for the test methods of the test suite are organized correctly based on costs associated with the first and second test fixtures. For example, if the second test fixture costs more to set up and tear down than the first test fixture, client device 210 may determine that the test methods associated with the second test fixture should be scheduled and executed after the test methods associated with the first test fixture.

In some implementations, client device 210 may respect an ordering of the test suite based on instructions from the user of client device 210. In some implementations, client device 210 may determine whether the ordering for the test methods of the test suite are organized correctly based on other factors, such as, for example, license availability associated with resources (e.g., test fixtures) executing the test methods of the test suite, availability of parallel execution resources (e.g., test fixtures) for the test methods of the test suite, etc.

Returning to FIG. 4, if the test suite is not optimally organized (block 440—NO), process 400 may include proposing a reorganized test suite based on the analysis (block 450). For example, client device 210 may determine that the ordering for the test methods of the test suite is not correct based on the analysis of which test fixtures are shared, timing associated with the test fixtures, costs associated with the test fixtures, etc. Based on this determination, client device 210 may reorganize the ordering for the test methods of the test suite, and may provide the proposed reorganized test suite for display to the user. The user may review the proposed reorganized test suite, and may instruct client device 210 to utilize the proposed reorganized test suite or the original ordering of the test suite. Based on this instruction, client device 210 may store the proposed reorganized test suite or the original ordering of the test suite in a memory (e.g., main memory 330, ROM 340, and/or storage device 350 of FIG. 3) associated with client device 210.

As further shown in FIG. 4, if the test suite is optimally organized (block 440—YES), process 400 may include outputting and/or storing the test suite (block 460). For example, client device 210 may determine that the ordering for the test methods of the test suite is correct based on the analysis of which test fixtures are shared, timing associated with the test fixtures, costs associated with the test fixtures, etc. Based on this determination, client device 210 may output (e.g., display) the test suite to the user and/or may store the test suite in a memory (e.g., main memory 330, ROM 340, and/or storage device 350 of FIG. 3) associated with client device 210.

While FIG. 4 shows process 400 as including a particular quantity and arrangement of blocks, in some implementations, process 400 may include fewer blocks, additional blocks, or a different arrangement of blocks. Additionally, or alternatively, some of the blocks may be performed in parallel.

Example Organization of a Test Suite Based on Test Fixtures

Figure 5B:
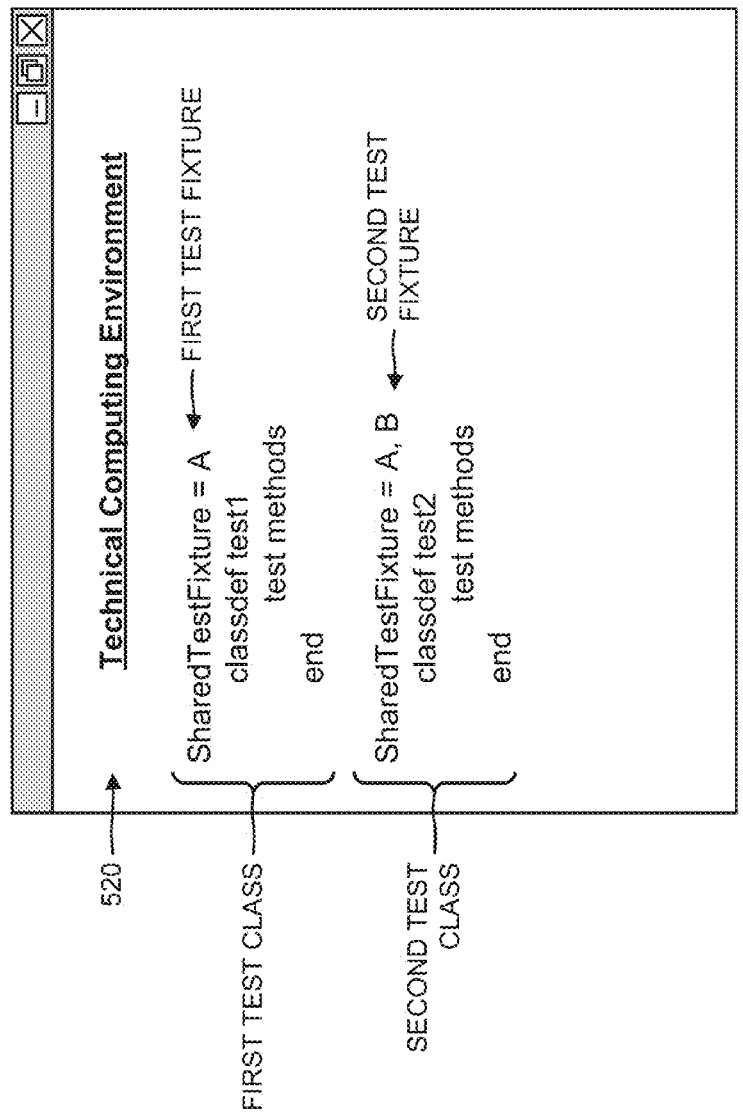

FIGS. 5A-5E are diagrams of an example 500 of the process described above with respect to FIG. 4. In example 500, assume that client device 210 provides a user interface 510 for display to a user, as shown in FIG. 5A. User interface 510 may enable the user to input code via TCE 240, and may include information that enables a user to select a portion of the code. For example, the user to may select a code portion from the code so that the code portion may be tested by one or more test methods.

In example 500, assume further that the user utilizes TCE 240 to input a first test class, as shown in user interface 510 of FIG. 5A. For example, the user may input the following information for the first test class:
SharedTestFixture=A
classdef test1
test methods
end,
where SharedTestFixture may define test fixture(s) for the first test class, A may correspond to a first test fixture, test1 may correspond to the first test class, and test methods may correspond to test methods of the first test class. Client device 210/TCE 240 may receive the first test class and the first test fixture via user interface 510.

Assume further that the user utilizes client device 210/TCE 240 to input a second test class, as shown in a user interface 520 of FIG. 5B. For example, the user may input the following information for the second test class:
SharedTestFixture=A, B
classdef test2
test methods
end,
where SharedTestFixture may define test fixtures for the second test class, A may correspond to the first test fixture, B may correspond to a second test fixture, test2 may correspond to the second test class, and test methods may correspond to test methods of the second test class. Client device 210/TCE 240 may receive the second test class, the first test fixture, and the second test fixture via user interface 520.

Figure 5C:
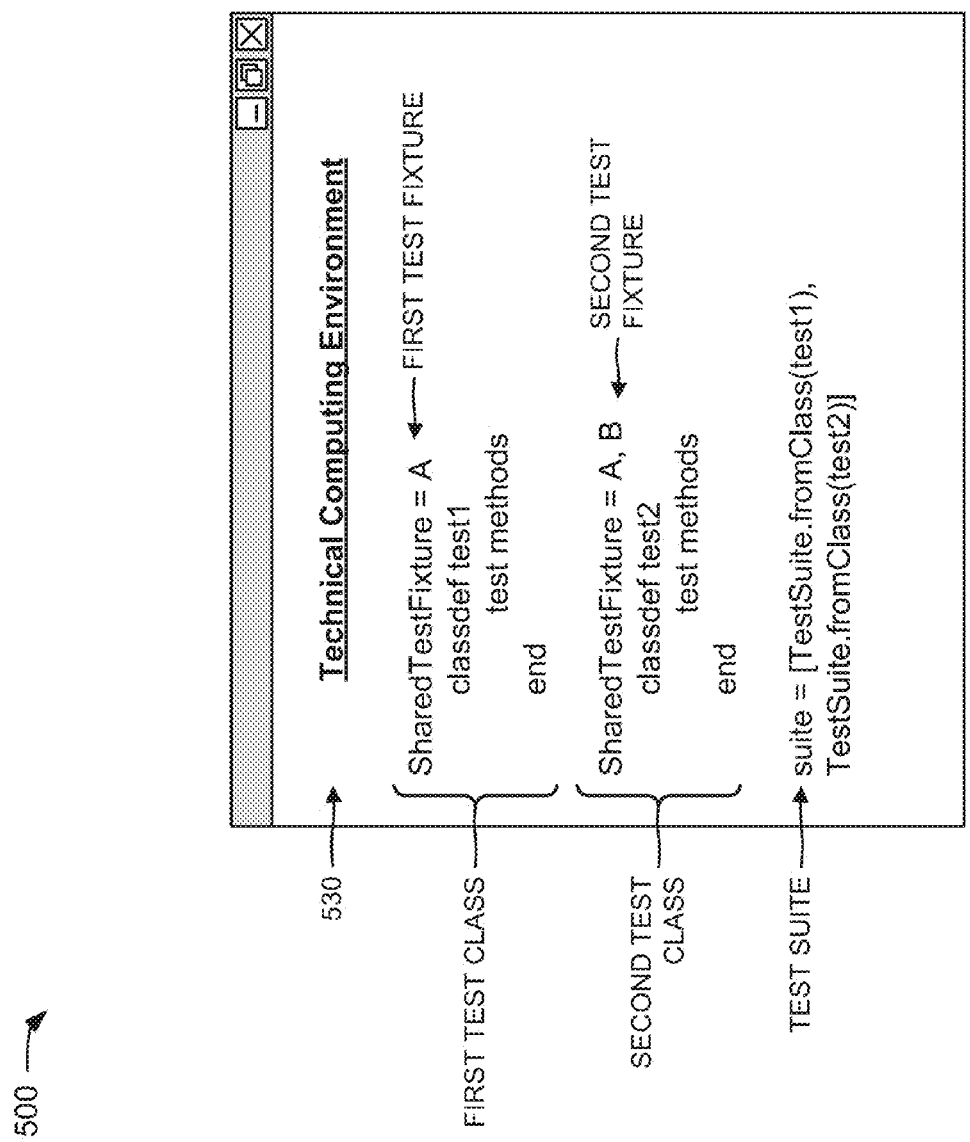

In example 500, assume that the user utilizes client device 210/TCE 240 to create a test suite, as shown in a user interface 530 of FIG. 5C. For example, the user may input the following information to create the test suite:
suite=[TestSuite.fromClass (test1), TestSuite.fromClass(test2)],
where suite may correspond to the test suite, test1 may correspond to the first test class, test2 may correspond to the second test class, and TestSuite.fromClass may correspond to a test suite command that creates the test suite from the test methods provided in the first test class and the second test class. Client device 210/TCE 240 may receive the test suite command, and may create, based on the command, the test suite that includes a combination of the test methods provided in the first test class and the second test class.

Figure 5D:
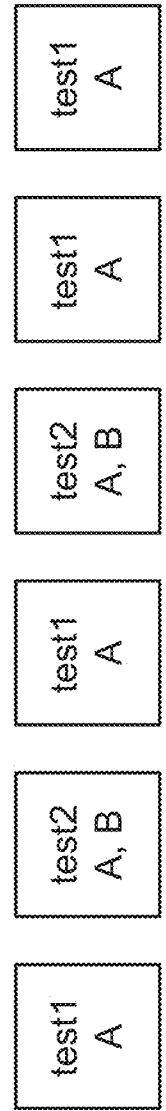

In example 500, client device 210 may create a test suite array 540, as shown in FIG. 5D, based on the first test class, the second test class, and the test suite command. Test suite array 540 may include a dynamic array of suite elements. Each suite element may include one or more test methods associated with the first test class or the second test class, and one or more test fixtures. For example, as shown in FIG. 5D, test suite array 540 may include a first suite element that includes a test method(s) for the first test class (e.g., test1) and the first test fixture (e.g., A); a second suite element that includes a test method(s) for the second test class (e.g., test2), the first test fixture, and the second test fixture (e.g., B); a third suite element that includes a test method(s) for the first test class and the first test fixture; a fourth suite element that includes a test method(s) for the second test class, the first test fixture, and the second test fixture; a fifth suite element that includes a test method(s) for the first test class and the first test fixture; and a sixth suite element that includes a test method(s) for the first test class and the first test fixture.

Client device 210 may analyze the test methods of test suite array 540 to determine which test methods share the same test fixtures. In some implementations, client device 210 may determine that the test methods of the first test class and the second test class share the first test fixture (e.g., A). Based on this determination, client device 210 may determine that test suite array 540 is not ordered in an efficient manner. For example, client device 210 may determine that the suite elements associated with the second test fixture should be grouped together since this would require setting up and tearing the second test fixture only once.

Client device 210 may automatically reorder the suite elements of test suite array 540 to generate a proposed test suite array 540. In some implementations, client device 210 may execute the proposed test suite array 540 without asking for permission from the user of client device 210. In some implementations, client device 210 may display the proposed test suite array 540 to the user in a user interface 550 of FIG. 5E. As shown, user interface 550 may include information requesting whether the user wants to change the order of the test suite to the order of the proposed test suite array 540. If the user elects to change the order of the test suite, client device 210 may utilize the proposed test suite array 540. If the user elects to not change the order of the test suite, client device 210 may utilize test suite array 540 (FIG. 5D). As further shown in FIG. 5E, the proposed test suite array 540 may include four suite elements that include the test method(s) of the first test class (e.g., test1) and the first test fixture (e.g., A) followed by two suite elements that include the test method(s) of the second test class (e.g., test2), the first test fixture (e.g., A), and the second test fixture (e.g., B).

As indicated above, FIGS. 5A-5E are provided merely as an example. Other examples are possible and may differ from what was described with regard to FIGS. 5A-5E.

Example Process for Ordering and Executing a Test Suite

Figure 6:
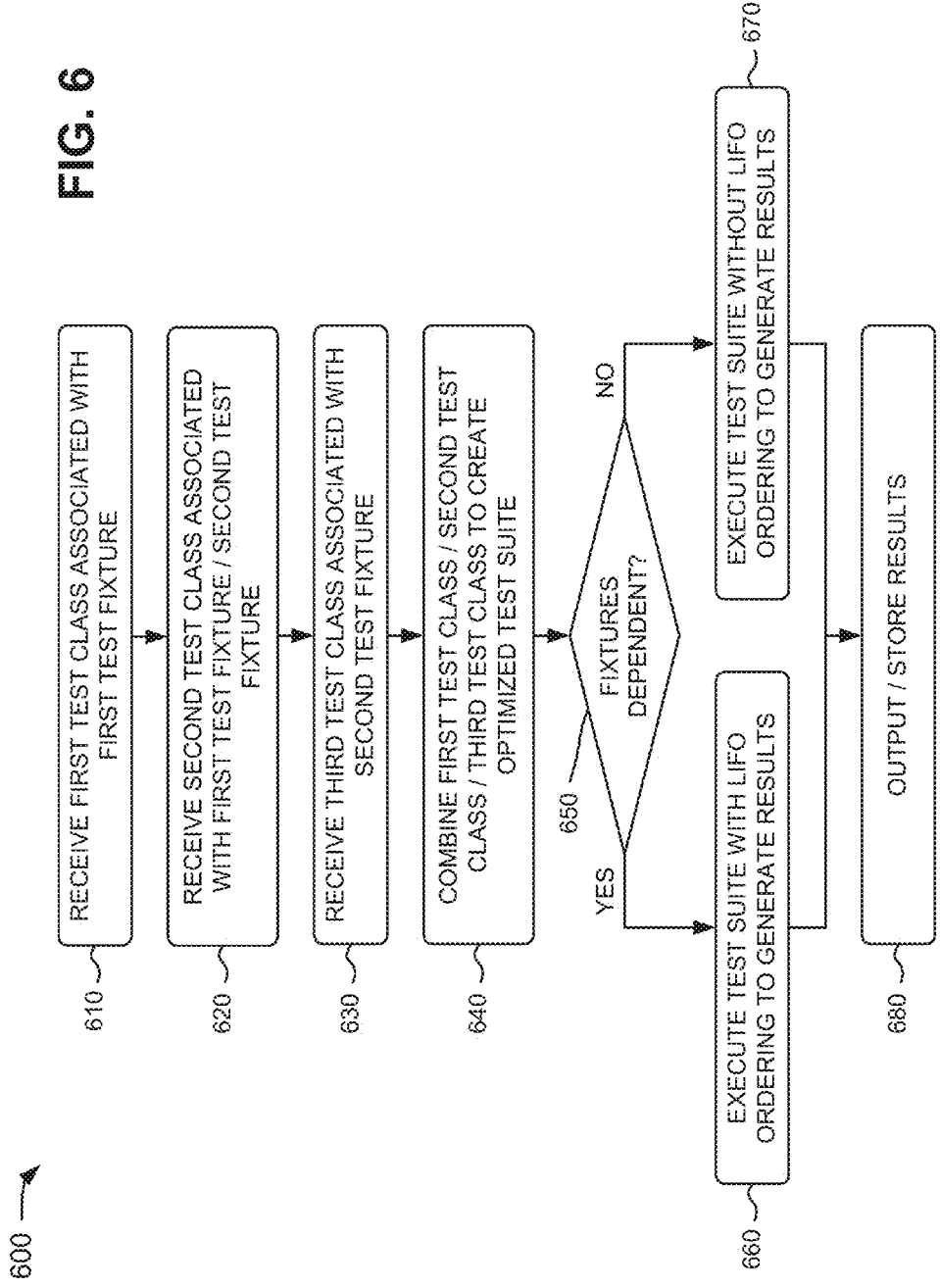
FIG. 6 is a flow chart of an example process for ordering and executing a test suite.

FIG. 6 is a flow chart of an example process 600 for ordering and executing a test suite. In some implementations, process 600 may be performed by client device 210 (e.g., TCE 240). In some implementations, process 600 may be performed by another device or a group of devices (e.g., server device 220) separate from or including client device 210.

As shown in FIG. 6, process 600 may include receiving a first test class associated with a first test fixture (block 610). For example, a user of client device 210 may provide a first test class to an environment (e.g., TCE 240) of client device 210. The first test class may include one or more test methods that may be used to test one or more portions of code generated via TCE 240. The first test class may be associated with a first test fixture. In some implementations, the first test class may include syntax of a general form:

SharedTestFixture=A
    classdef test1, where test1 may correspond to the first test class, and A may correspond to the first test fixture. Client device 210/TCE 240 may receive the first test class and the first test fixture, and may store the first test class and the first test fixture in a memory (e.g., main memory 330, ROM 340, and/or storage device 350 of FIG. 3) associated with client device 210. In some implementations, client device 210/TCE 240 may retrieve the first test class and the first test fixture from the memory.

As further shown in FIG. 6, process 600 may include receiving a second test class associated with the first test fixture and a second test fixture (block 620). For example, a user of client device 210 may provide a second test class to an environment (e.g., TCE 240) of client device 210. The second test class may include one or more test methods that may be used to test one or more portions of the code generated via TCE 240. The second test class may be associated with the first test fixture and a second test fixture. In some implementations, the second test class may include syntax of a general form:

SharedTestFixture=A, B
    classdef test2, where test2 may correspond to the second test class, A may correspond to the first test fixture, and B may correspond to the second test fixture. Client device 210/TCE 240 may receive the second test class, the first test fixture, and the second test fixture, and may store the second test class, the first test fixture, and the second test fixture in a memory (e.g., main memory 330, ROM 340, and/or storage device 350 of FIG. 3) associated with client device 210. In some implementations, client device 210/TCE 240 may retrieve the second test class, the first test fixture, and the second test fixture from the memory.

Returning to FIG. 6, process 600 may include receiving a third test class associated with the second test fixture (block 630). For example, a user of client device 210 may provide a third test class to an environment (e.g., TCE 240) of client device 210. The third test class may include one or more test methods that may be used to test one or more portions of code generated via TCE 240. The third test class may be associated with the second test fixture. In some implementations, the third test class may include syntax of a general form:

SharedTestFixture=B
    classdef test3, where test3 may correspond to the third test class, and B may correspond to the second test fixture. Client device 210/TCE 240 may receive the third test class and the second test fixture, and may store the third test class and the second test fixture in a memory (e.g., main memory 330, ROM 340, and/or storage device 350 of FIG. 3) associated with client device 210. In some implementations, client device 210/TCE 240 may retrieve the third test class and the second test fixture from the memory.

As further shown in FIG. 6, process 600 may include combining the first test class, the second class, and the third test class to create an optimized test suite (block 640). For example, the user may provide a test suite command to client device 210/TCE 240. The test suite command may include syntax of a general form:

suite=[TestSuite.fromClass(test1), TestSuite.fromClass(test2), TestSuite.fromClass(test3)], where suite may correspond to the test suite, TestSuite.fromClass may correspond to the test suite command that creates the test suite from the test methods provided in the test classes, test1 may correspond to the first test class, test2 may correspond to the second test class, and test3 may correspond to the third test class. Client device 210/TCE 240 may receive the test suite command, and may create, based on the command, a test suite that includes a combination of the test methods of the first test class, the second test class, and the third test class.

In some implementations, client device 210 may analyze the test methods of the test suite to determine which test methods share the same test fixtures. For example, the test methods of the first test class and the second test class may share the first test fixture, and the test methods of the second test class and the third test class may share the second test fixture. Based on this determination, client device 210 may group one or more of the test methods of the first test class and the second test class together, and/or may group one or more of the test methods of the second test class and the third test class together. Grouping these test methods together may provide an efficient ordering for the test methods.

In some implementations, client device 210 may determine whether the ordering for the test methods of the test suite are organized correctly based on timing associated with the first and second test fixtures, costs associated with the first and second test fixtures, user instructions for a particular ordering, license availability associated with resources executing the test methods of the test suite, availability of parallel execution resources for the test methods of the test suite, etc.

Returning to FIG. 6, process 600 may include determining whether the test fixtures are dependent (block 650). For example, client device 210/TCE 240 may determine whether the first test fixture and the second test fixture are dependent. In some implementations, client device 210/TCE 240 may determine that the first test fixture and the second test fixture are dependent when the first test fixture interferes with an environmental state of the second test fixture or vice versa. For example, the first test fixture may provide a license that is required by the second test fixture. In some implementations, client device 210/TCE 240 may determine that the first test fixture and the second test fixture are not dependent when the first and second test fixtures do not interfere with each other. For example, the first test fixture may be associated with a different resource than the second test fixture.

As further shown in FIG. 6, when the test fixtures are dependent (block 650—YES), process 600 may include executing the test suite with LIFO ordering to generate results (block 660). For example, client device 210/TCE 240 may determine that the first test fixture and the second test fixture are dependent. If client device 210/TCE 240 is unable to determine whether the first test fixture and the second test fixture are dependent, client device 210/TCE 240 may assume that the test fixtures are dependent. Based on this determination, client device 210/TCE 240 may provide, in LIFO ordering, the order that the test fixtures are set up and torn down when the tests corresponding to each element of the test suite are executed.

With such an arrangement, client device 210/TCE 240 may set up the first test fixture (e.g., A), and may execute the test methods of the first test class with the first test fixture. Client device 210/TCE 240 may set up the second test fixture (e.g., B), and may execute the test methods of the second test class with the first test fixture and the second test fixture. Client device 210/TCE 240 may tear down the second test fixture, and may tear down the first test fixture. Client device 210/TCE 240 may set up the second test fixture again, and may execute the test methods of the third test class with the second test fixture. Thus, the first test class and the second test class may share the first test fixture. The second test class and the third test class may not share the first test fixture since the first test fixture must be torn down. The second test fixture must be torn down before the first test fixture is torn down in order to maintain LIFO ordering.

In some implementations, LIFO ordering may be employed to ensure that the fixture state is correctly restored. When two test fixtures can affect the same software state (i.e., the test fixtures are dependent), yet the test fixtures are not torn down in a reverse order that they are set up, a second test fixture may overlap a correct starting state of the first test fixture and create an incorrect fixture state. LIFO ordering may permit each test method to be independently executed and a test array to be dynamically reordered without sacrificing this correctness.

Returning to FIG. 6, when the test fixtures are not dependent (block 650—NO), process 600 may include executing the test suite without LIFO ordering to generate results (block 670). For example, client device 210/TCE 240 may determine that the first test fixture and the second test fixture are not dependent. Based on this determination, client device 210/TCE 240 may order the test methods of the test suite in any order without sacrificing correctness or efficiency. For example, client device 210/TCE 240 may schedule the test methods of the first test class (e.g., test1) first, may schedule the test methods of the second test class (e.g., test2) second, and may schedule the test methods of the third test class (e.g., test3) last.

With such an arrangement, client device 210/TCE 240 may set up the first test fixture (e.g., A), and may execute the test methods of the first test class with the first test fixture. Client device 210/TCE 240 may set up the second test fixture (e.g., B), and may execute the test methods of the second test class with the first test fixture and the second test fixture. Client device 210/TCE 240 may tear down the first test fixture, and may execute the test methods of the third test class with the second test fixture. Such an arrangement may save time and expense over the LIFO ordering since the second test fixture does not need to be torn down and set up in order to execute the test methods of the third test class.

As further shown in FIG. 6, process 600 may include outputting and/or storing the generated results (block 680). For example, client device 210 may output (e.g., display) the results of the execution of the test suite, and/or may store the results in a memory (e.g., main memory 330, ROM 340, and/or storage device 350 of FIG. 3) associated with client device 210. In some implementations, client device 210 may output and/or store the results of the execution of the test methods associated with the first test class (e.g., test1), the second test class (e.g., test2), and/or or the third test class (e.g., test3).

While FIG. 6 shows process 600 as including a particular quantity and arrangement of blocks, in some implementations, process 600 may include fewer blocks, additional blocks, or a different arrangement of blocks. Additionally, or alternatively, some of the blocks may be performed in parallel.

Example Ordering and Execution of a Test Suite

Figure 7B:
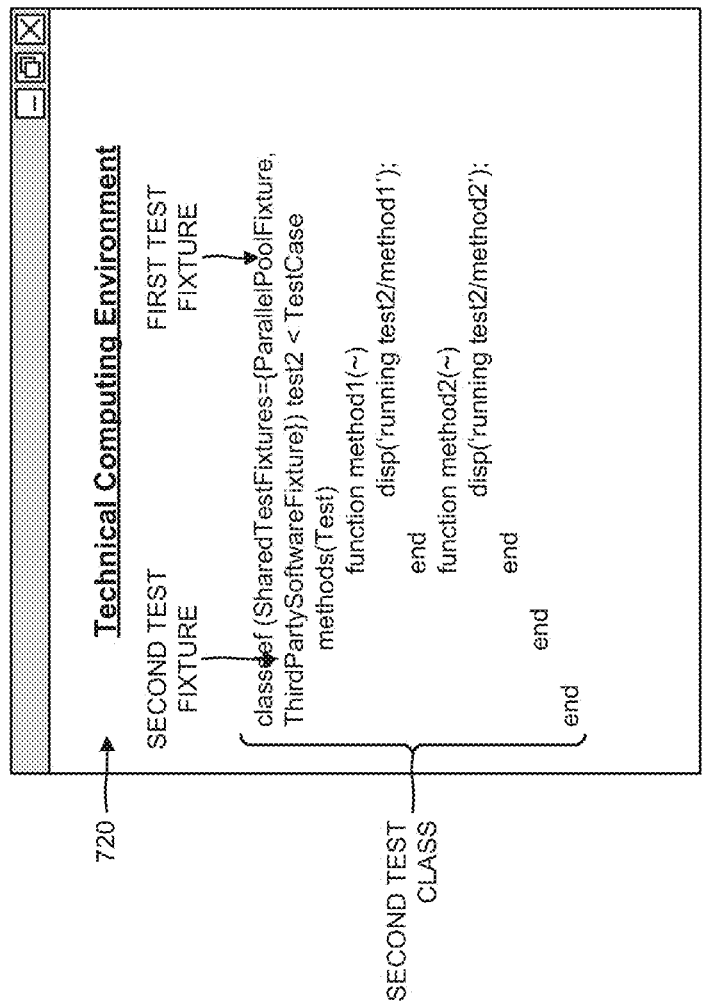

FIGS. 7A-7H are diagrams of an example 700 of the process described above with respect to FIG. 6. In example 700 and as shown in FIG. 7A, assume that client device 210 executes a computing environment (e.g., TCE 240) that generates a user interface 710 for inputting a first test class. Client device 210/TCE 240 may display user interface 710 so that a user may input information for the first test class. In example 700 and as shown in FIG. 7A, assume that the user inputs the following information for the first test class:

classdef      (SharedTestFixtures={ParallelPoolFixture})
       test1<TestCase
       methods (Test)
          function method1(~)
             disp('running test1/method1');
          end
          function method2(~)
             disp('running test1/method2');
          end
       end
    end, where ParallelPoolFixture may correspond to a first test fixture, test1 may correspond to the first test class, method1 may correspond to a first test method of the first test class, and method2 may correspond to a second test method of the first test class. For demonstration purposes, the first test fixture, the first test method, and the second test method may be displayed when they are executed so that the execution flow may be seen.

In example 700 and as shown in FIG. 7B, assume that client device 210 executes a computing environment (e.g., TCE 240) that generates a user interface 720 for inputting a second test class. Client device 210/TCE 240 may display user interface 720 so that a user may input information for the second test class. In example 700 and as shown in FIG. 7B, assume that the user inputs the following information for the second test class:

classdef (SharedTestFixtures={ParallelPoolFixture,
    ThirdPartySoftwareFixture}) test2<TestCase
       methods(Test)
          function method1(~)
             disp('running test2/method1');
          end
          function method2(~)
             disp('running test2/method2');
          end
       end
    end, where ParallelPoolFixture may correspond to the first test fixture, ThirdPartySoftwareFixture may correspond to a second test fixture, test2 may correspond to the second test class, method1 may correspond to a first test method of the second test class, and method2 may correspond to a second test method of the second test class. For demonstration purposes, the first test fixture, the second test fixture, the first test method, and the second test method may be displayed when they are executed so that the execution flow may be seen.

In example 700 and as shown in FIG. 7C, assume that client device 210 executes a computing environment (e.g., TCE 240) that generates a user interface 730 for inputting a third test class. Client device 210/TCE 240 may display user interface 730 so that a user may input information for the third test class. In example 700 and as shown in FIG. 7C, assume that the user inputs the following information for the third test class:
　　classdef
　　　　(SharedTestFixtures={ThirdPartySoftwareFixture})
　　　　test3<
　　TestCase
　　　　methods(Test)
　　　　　　function method1(~)
　　　　　　　　disp('running test3/method1');
　　　　　　end
　　　　　　function method2(~)
　　　　　　　　disp('running test3/method2');
　　　　　　end
　　　　end
　　end,
where ThirdPartySoftwareFixture may correspond to the second test fixture, test3 may correspond to the third test class, method1 may correspond to a first test method of the third test class, and method2 may correspond to a second test method of the third test class. For demonstration purposes, the second test fixture, the first test method, and the second test method may be displayed when they are executed so that the execution flow may be seen.

In example 700 and as shown in FIG. 7D, assume that client device 210 executes a computing environment (e.g., TCE 240) that generates a user interface 740 for inputting the first test fixture. Client device 210/TCE 240 may display user interface 740 so that a user may input information for the first test fixture. In example 700 and as shown in FIG. 7D, assume that the user inputs the following information for the first test fixture:

```
classdef ParallelPoolFixture < Fixture
    methods
        function setup(~)
            disp('Setting up ParallelPoolFixture');
        end
        function teardown(~)
            disp('Tearing down ParallelPoolFixture');
        end
    end
end,
``` where ParallelPoolFixture may correspond to the first test fixture, setup may correspond to a function for setting up the first test fixture, and teardown may correspond to a function for tearing down the first test fixture. For demonstration purposes, the setup function and the teardown function may be displayed when they are executed so that the execution flow may be seen.

Figure 7E:
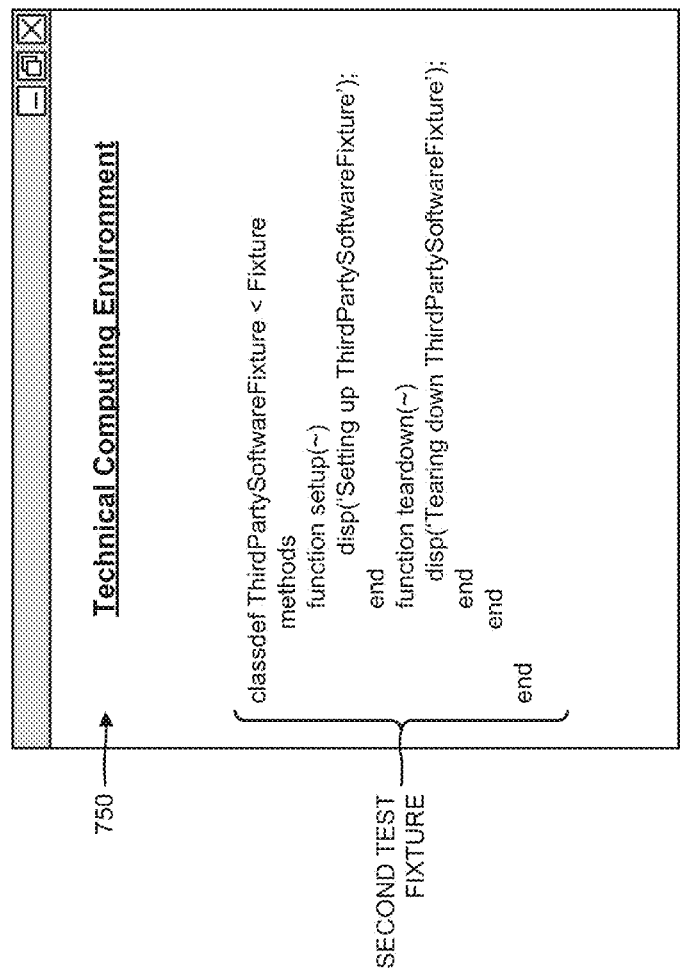

In example 700 and as shown in FIG. 7E, assume that client device 210 executes a computing environment (e.g., TCE 240) that generates a user interface 750 for inputting the second test fixture. Client device 210/TCE 240 may display user interface 750 so that a user may input information for the second test fixture. In example 700 and as shown in FIG. 7E, assume that the user inputs the following information for the second test fixture:

```
classdef ThirdPartySoftwardFixture < Fixture
    methods
        function setup(~)
            disp('Setting up ThirdPartySoftwareFixture');
        end
```

-continued

```
        function teardown(~)
            disp('Tearing down ThirdPartySoftwareFixture');
        end
    end
end,
``` where ThirdPartySoftwareFixture may correspond to the second test fixture, setup may correspond to a function for setting up the second test fixture, and teardown may correspond to a function for tearing down the second test fixture. For demonstration purposes, the setup function and the teardown function may be displayed when they are executed so that the execution flow may be seen.

In example 700 and as shown in FIG. 7F, assume that client device 210 executes a computing environment (e.g., TCE 240) that generates a user interface 760 for inputting a test suite command. Client device 210/TCE 240 may display user interface 760 so that a user may input information for the test suite command. In example 700 and as shown in FIG. 7F, assume that the user inputs the following information for the test suite command:
　　suite=[TestSuitefromClass(test1), 　　TestSuite.fromClass
　　　　(test2), TestSuite.fromClass(test3)],
where suite may correspond to the test suite, TestSuite,fromClass may correspond to the test suite command, test1 may correspond to the first test class, test2 may correspond to the second test class, test3 may correspond to the third test class. Client device 210/TCE 240 may receive the test suite command, and may create a test suite that includes the test methods of the first test class, the second test class, and the third test class. As further shown in FIG. 7F, the test suite may include a one by six array associated with a name (e.g., suite), the first test fixture, and the second test fixture.

Figure 7G:
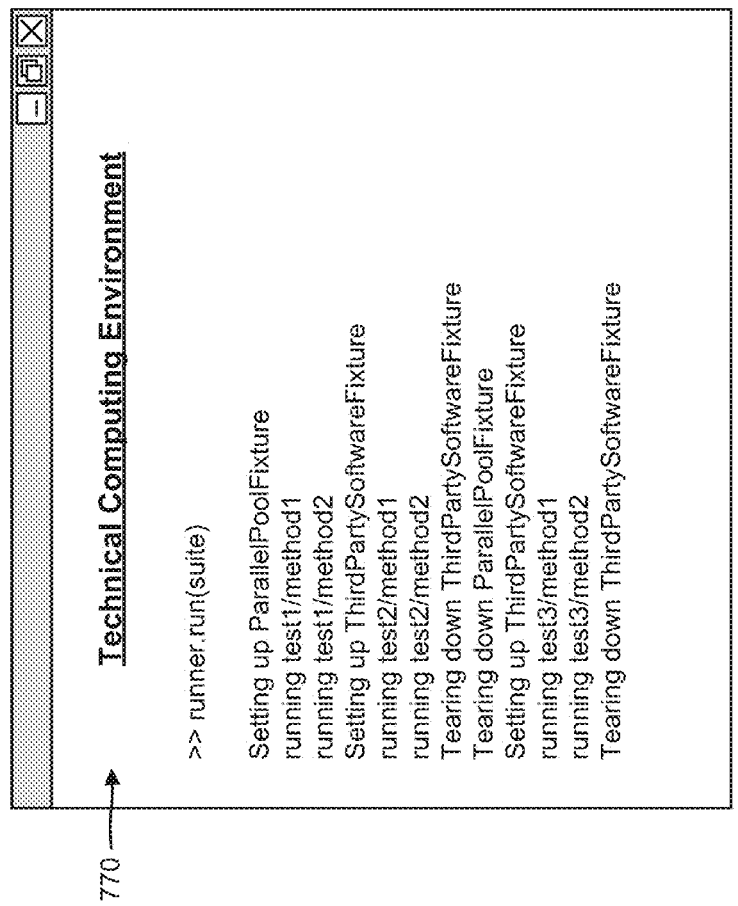

In example 700 and as shown in FIG. 7G, assume that client device 210 executes a computing environment (e.g., TCE 240) that generates a user interface 770 for executing the test suite. Client device 210/TCE 240 may display user interface 770 so that a user may input a command for executing the test suite. In example 700 and as shown in FIG. 7G, assume that the user inputs the command runner.run(suite) to execute the test suite. Further assume that the first test fixture and the second test fixture are dependent, and that client device 210 orders the test fixture tear down according to LIFO ordering. Based on these assumptions, execution of the test suite may generate the following information, as shown in FIG. 7G:
　　Setting up ParallelPoolFixture
　　running test1/method1
　　running test1/method2
　　Setting up ThirdPartySoftwareFixture
　　running test2/method1
　　running test2/method2
　　Tearing down ThirdPartySoftwareFixture
　　Tearing down ParallelPoolFixture
　　Setting up ThirdPartySoftwareFixture
　　running test3/method1
　　running test3/method2
　　Tearing down ThirdPartySoftwareFixture.

Thus, during execution of the test suite, the first test fixture (e.g., ParallelPoolFixture) may be set up, and the first and second methods of the first test class (e.g., test1) may be executed. The second test fixture (e.g., ThirdPartySoftwareFixture) may be set up, and the first and second methods of the second test class (e.g., test2) may be executed. The second test fixture may be torn down, the first test fixture may be torn down, and the second test fixture may be set up again. The first and second methods of the third test class (e.g., test3) may be executed, and the second test fixture may be torn down.

In example 700 and as shown in FIG. 7H, assume that client device 210 executes a computing environment (e.g., TCE 240) that generates a user interface 780 for executing the test suite. Client device 210/TCE 240 may display user interface 780 so that a user may input a command for executing the test suite. In example 700 and as shown in FIG. 7H, assume that the user inputs the command runner.run(suite) to execute the test suite. Further assume that the first test fixture and the second test fixture are independent, and that client device 210 may order the test fixture tear down according to any order. Based on these assumptions, execution of the test suite may generate the following information, as shown in FIG. 7H:

Setting up ParallelPoolFixture
running test1/method1
running test1/method2
Setting up ThirdPartySoftwareFixture
running test2/method1
running test2/method2
Tearing down ParallelPoolFixture
running test3/method1
running test3/method2
Tearing down ThirdPartySoftwareFixture.

Thus, during execution of the test suite, the first test fixture (e.g., ParallelPoolFixture) may be set up, and the first and second methods of the first test class (e.g., test1) may be executed. The second test fixture (e.g., ThirdPartySoftwareFixture) may be set up, and the first and second methods of the second test class (e.g., test2) may be executed. The first test fixture may be torn down. The first and second methods of the third test class (e.g., test3) may be executed, and the second test fixture may be torn down.

As indicated above, FIGS. 7A-7H are provided merely as an example. Other examples are possible and may differ from what was described with regard to FIGS. 7A-7H.

CONCLUSION

Systems and/or methods described herein may provide a mechanism for robust and efficient sharing of test fixtures that configure environmental state for test execution. The systems and/or methods may enable a combination (e.g., a test suite) of test methods to be executed in an efficient manner. As each test method in the test suite is executed, any test fixtures that had been set up for previous test methods and are no longer needed may be torn down (e.g., disabled). Any required test fixtures, which are not already set up (e.g., enabled), may be set up. If particular test fixtures are guaranteed to not interfere with other test fixtures, the particular test fixtures may be set up and torn down in any order.

The foregoing description of implementations provides illustration and description, but is not intended to be exhaustive or to limit the implementations to the precise form disclosed. Modifications and variations are possible in light of the above teachings or may be acquired from practice of the implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the implementations may be implemented as a "component" that performs one or more functions. This component may include hardware, such as a processor, an ASIC, or a FPGA, or a combination of hardware and software.

Even though particular combinations of features are recited in the claims and/or disclosed in the specification, these combinations are not intended to limit the disclosure of the specification. In fact, many of these features may be combined in ways not specifically recited in the claims and/or disclosed in the specification. Although each dependent claim listed below may directly depend on only one other claim, the disclosure of the specification includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
    receiving a first test class associated with a first test fixture,
        the first test class including one or more first test methods to test one or more portions of dynamically-type programming code,
        the first test fixture identifying one or more first environments for the one or more first test methods, and
        the receiving the first test class being performed by a device;
    receiving a second test class associated with the first test fixture and a second test fixture,
        the second test class including one or more second test methods to test the one or more portions of the dynamically-type programming code,
        the first test fixture identifying the one or more first environments for the one or more second test methods,
        the second test fixture identifying one or more second environments for the one or more second test methods, and
        the receiving the second test class being performed by a device;
    combining the one or more first test methods of the first test class and the one or more second test methods of the second test class to create a test group; and
    executing the test group,
        executing the test group including selectively enabling and disabling the first test fixture and the second test fixture,
        the executing the test group being performed by the device.

2. The method of claim 1, further comprising:
    determining whether the test group is satisfactorily organized based on the first test fixture and the second test fixture; and
    outputting or storing the test group when the test group is correctly organized.

3. The method of claim 2, where analyzing the test group includes at least one of:
    analyzing the test group based on timing associated with the first test fixture or the second test fixture;
    analyzing the test group based on costs associated with the first test fixture or the second test fixture;

analyzing the test group based on license information associated with the first test fixture or the second test fixture; or analyzing the test group based on availabilities associated with the first test fixture or the second test fixture.

4. The method of claim 1, further comprising:

analyzing the test group to determine whether the test group is satisfactorily organized based on the first test fixture and the second test fixture; and providing a reorganized test group, as the test group, when the test group is not satisfactorily organized.

5. The method of claim 4, further comprising:

providing the reorganized test group as a recommendation when the test group is incorrectly organized;

receiving instructions to utilize the reorganized test group based on the recommendation;

executing the reorganized test group to generate results; and outputting or storing the results.

6. The method of claim 4, where analyzing the test group includes:

determining whether the first test fixture and the second test fixture are dependent.

7. The method of claim 6, where executing the test group further comprises:

executing the test group with last-in, first-out (LIFO) ordering to generate results when the first test fixture and the second test fixture are dependent; and outputting or storing the results.

8. The method of claim 5, where executing the test group further comprises:

executing the test group without last-in, first-out (LIFO) ordering to generate results when the first test fixture and the second test fixture are independent; and outputting or storing the results.

9. A non-transitory computer-readable medium for storing instructions, the instructions comprising:

one or more instructions that, when executed by a processor of a device, cause the processor to:

receive a first test class associated with a first test fixture,
the first test class including one or more first test methods to test one or more portions of dynamically-typed programming code, and
the first test fixture identifying one or more first environments for the one or more first test methods, receive a second test class associated with the first test fixture and a second test fixture,
the second test class including one or more second test methods to test the one or more portions of the dynamically-typed programming code,
the first test fixture identifying the one or more first environments for the one or more second test methods, and
the second test fixture identifying one or more second environments for the one or more second test methods, combine the one or more first test methods of the first test class and the one or more second test methods of the second test class to create a test group, and execute the test group,
where the one or more instructions, that cause the processor to execute the test group, further cause the processor to selectively enable and disable the first test fixture and the second test fixture at a timing based on whether the one or more first test methods are being executed or the one or more second test methods are being executed.

10. The non-transitory computer-readable medium of claim 9, where the instructions further comprise:

one or more instructions that, when executed by the processor, cause the processor to:

analyze the test group to determine whether the test group is correctly organized based on the first test fixture and the second test fixture, and provide a reorganized test group, as the test group, when the test group is incorrectly organized.

11. The non-transitory computer-readable medium of claim 10, where the one or more instructions to analyze the test group further comprise:

one or more instructions that, when executed by the processor, cause the processor to at least one of:

analyze the test group based on timing associated with the first test fixture or the second test fixture, analyze the test group based on costs associated with the first test fixture or the second test fixture, analyze the test group based on license information associated with the first test fixture or the second test fixture, or analyze the test group based on availabilities associated with the first test fixture or the second test fixture.

12. The non-transitory computer-readable medium of claim 10, where the instructions further comprise:

one or more instructions that, when executed by the processor, cause the processor to:

output or store the test group when the test group is correctly organized.

13. The non-transitory computer-readable medium of claim 10, where the instructions further comprise:

one or more instructions that, when executed by the processor, cause the processor to:

provide the reorganized test group as a recommendation when the test group is incorrectly organized, receive instructions to utilize the reorganized test group based on the recommendation, execute the reorganized test group to generate results, and output or store the results.

14. The non-transitory computer-readable medium of claim 10, where the one or more instructions to analyze the test group further comprise:

one or more instructions that, when executed by the processor, cause the processor to:

determine whether the first test fixture and the second test fixture are dependent.

15. The non-transitory computer-readable medium of claim 14, where the instructions further comprise:

one or more instructions that, when executed by the processor, cause the processor to:

execute the test group with last-in, first-out (LIFO) ordering to generate results when the first test fixture and the second test fixture are dependent, and output or store the results.

16. The non-transitory computer-readable medium of claim 14, where the instructions further comprise:

one or more instructions that, when executed by the processor, cause the processor to:

execute the test group without last-in, first-out (LIFO) ordering to generate results when the first test fixture and the second test fixture are independent, and output or store the results.

17. A device comprising:

one or more processors to:

receive a first test class associated with a first test fixture,
the first test class including one or more first test methods to test one or more portions of dynamically-type programming code, and the first test fixture identifying one or more first environments for the one or more first test methods,
receive a second test class associated with the first test fixture and a second test fixture,
the second test class including one or more second test methods to test the one or more portions of the dynamically-type programming code,
the first test fixture identifying the one or more first environments for the one or more second test methods, and
the second test fixture identifying one or more second environments for the one or more second test methods,
combine the one or more first test methods of the first test class and the one or more second test methods of the second test class to create a test group, and
execute the test group,
the one or more processors, when executing the test group, are further to selectively enable and disable the first test fixture and the second test fixture.

18. The device of claim 17, where the test group includes an ordering of enabling and disabling the first test fixture and the second test fixture, and
where the one or more processors, when executing the test group, are further to:
selectively enable and disable the first test fixture and the second test fixture based on the ordering;
execute the one or more first test methods when the first test fixture is enabled; and
execute the one or more second test methods when the first test fixture and the second test fixture are enabled.

19. The device of claim 17, where the first test fixture and the second test fixture do not interfere, and
where the one or more processors, when executing the test group, are further to:
enable the first test fixture and the second test fixture;
execute the one or more second test methods with the first test fixture and the second test fixture;
disable the second test fixture, without disabling the first test fixture prior to executing the one or more first test methods, based on the first test fixture and the second test fixture not interfering; and
execute the one or more first test methods with the first test fixture.

20. The device of claim 17, where the first fixture and the second test fixture interfere, and
where the one or more processors, when executing the test group, are further to:
enable the first test fixture and the second test fixture;
execute the one or more second test methods with the first test fixture and the second test fixture;
disable the second test fixture and the first test fixture based on the first test fixture and the second test fixture interfering;
re-enable the first test fixture; and
execute the one or more first test methods with the first test fixture.

* * * * *